(12) United States Patent
Lo et al.

(10) Patent No.: US 12,554,607 B2
(45) Date of Patent: Feb. 17, 2026

(54) DEBUGGING PACKET PROCESSING PIPELINES

(71) Applicant: Mellanox Technologies, Ltd., Yokneam (IL)

(72) Inventors: Alan Lo, Boulder, CO (US); Krishna Garlapati, Los Gatos, CA (US); Stephen Warren, Fort Collins, CO (US); Doron Ofek, Ramat-Hasharon (IL); Matan Azrad, Yokneam (IL)

(73) Assignee: Mellanox Technologies, Ltd., Yokneam (IL)

( * ) Notice: Subject to any disclaimer, the term of this patent is extended or adjusted under 35 U.S.C. 154(b) by 147 days.

(21) Appl. No.: 18/457,939

(22) Filed: Aug. 29, 2023

(65) Prior Publication Data

US 2025/0077375 A1 Mar. 6, 2025

(51) Int. Cl.
*G06F 11/263* (2006.01)
*G06F 11/362* (2025.01)
*H04L 1/1829* (2023.01)

(52) U.S. Cl.
CPC ........ *G06F 11/263* (2013.01); *G06F 11/3624* (2013.01); *G06F 11/3636* (2013.01); *G06F 11/3644* (2013.01); *H04L 1/1835* (2013.01)

(58) Field of Classification Search
CPC ............. G06F 11/3636; G06F 11/3644; G06F 11/3624
See application file for complete search history.

(56) References Cited

U.S. PATENT DOCUMENTS

| | | | | |
|---|---|---|---|---|
| 10,896,119 | B1* | 1/2021 | Ansari | G06F 11/364 |
| 11,669,432 | B1* | 6/2023 | Parandekar | G06F 11/3644 |
| | | | | 717/124 |
| 12,174,727 | B1* | 12/2024 | Hanebutte | G06F 8/41 |
| 2023/0064845 | A1* | 3/2023 | Srinivasan | H04L 43/10 |
| 2023/0068914 | A1* | 3/2023 | Srinivasan | H04L 43/18 |
| 2024/0129219 | A1* | 4/2024 | Stan | H04L 49/3063 |
| 2024/0296107 | A1* | 9/2024 | Todirel | G06F 11/3632 |

FOREIGN PATENT DOCUMENTS

WO WO-2021044191 A1 * 3/2021 ......... G05B 19/4185

* cited by examiner

*Primary Examiner* — Bryce P Bonzo
*Assistant Examiner* — Xinyuan Yu
(74) *Attorney, Agent, or Firm* — Lowenstein Sandler LLP

(57) ABSTRACT

A system includes a network device. The network device is to receive a packet comprising metadata. Responsive to determining that an entry in a match action table matches a match action lookup tuple based on the metadata, identify a debug instruction associated with the entry, the entry in the match action table identifying an action to be performed with respect to the packet. The debug instruction is executed. At least a portion of the debug instruction is executed prior to performing the action identified in the entry of the action table.

20 Claims, 8 Drawing Sheets

700

Identify one or more packets in a queue associated with a network device. 710

Extract debug information from the one or more packets. 712

Identify a program point within source code, wherein the program point corresponds to the debug information. 714

Send, to a user device, at least a portion of the debug information and the corresponding program point. 716

DEBUGGING PACKET PROCESSING PIPELINES

TECHNICAL FIELD

At least one embodiment pertains to processing resources used to perform and facilitate debugging packet processing pipelines in programmable network devices. For example, at least one embodiment pertains to processors or computing systems used to provide and enable a compiler to insert debug instructions into logic executing on a programmable network device, according to various novel techniques described herein.

BACKGROUND

Debugging procedures can help facilitate proper functioning and performance of a network infrastructure that includes network devices. Debugging network devices can involve identifying and resolving issues or errors that occur in the network devices.

BRIEF DESCRIPTION OF DRAWINGS

Various embodiments in accordance with the present disclosure will be described with reference to the drawings, in which.

DETAILED DESCRIPTION

Figure 1:
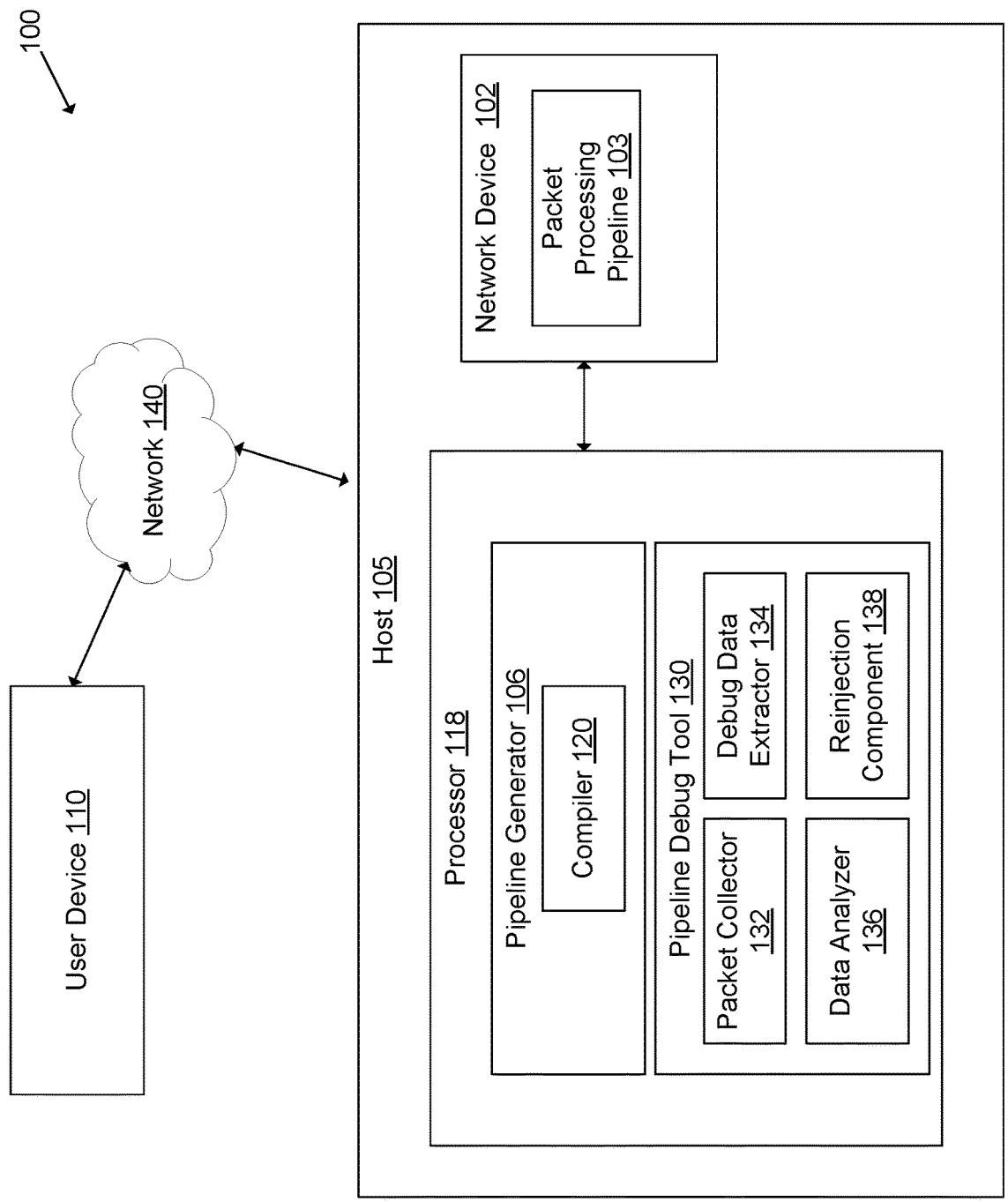
FIG. 1 depicts a block diagram of an example computer system environment architecture operating in accordance with one or more aspects of the present disclosure.

Aspects of the present disclosure are directed to debugging packet processing pipelines in programmable network devices (e.g., data processing units, smart network interface cards (NICs), network processing units (NPUs), network FPGA, switches, or routers). Programmable logic for networking pipelines can be customized by an end user. A pipeline, such as an application-specific integrated circuit (ASIC) pipeline), can refer to the flow of data and processing stages within a device to achieve efficient execution of a specific application or task. One example of such a pipeline is a packet processing pipeline executing in a programmable network device. Such pipelines can be programmed using a domain specific language, for example. However, programmed and customized pipelines greatly increase the complexity of both the customer defined logic running on the device and the underlying programmable framework that the pipeline compiler is built on. Conventional debugging solutions fail to address these complexities incorporated in such devices (e.g., programmable network devices). For instance, conventional debug methods are low-level (e.g., at the hardware data structure level), and are based on fixed pipeline functions that include pipeline data formats that are high-wired into the device. For example, some conventional network device debugging tools can provide debug data describing a state of the device when the device receives a packet, and a state of the device after the device has processed the packet, but do not provide additional information how the packet was processed through the customized and programmed pipeline of the device itself. As another example, some network device debugging tools can include telemetry, which involves sending a fixed set of data from a network device as a specific packet to a collector.

Aspects of the present disclosure address the above-noted and other deficiencies by providing a packet tracing framework that includes pipeline states, injected at programmable points in the pipeline. In some embodiments, the packet tracing can duplicate packets at select stages in the packet pipeline, include a programmable set of pipeline data, and send the results to a pipeline debugger tool for correlation and analysis. In other embodiments, a network device may not be capable of duplicating packets, and thus the packet tracing can send the packet to a debugger. Once the debugger has analyzed the packet, the packet can be reinjected into the pipeline.

Aspects of the present disclosure can include a compiler to compile the programmable pipeline (including debug instructions), pipeline configuration and runtime, and debug data acquisition and analysis. The compiler can insert debug instructions interspersed at identified program points in the program instructions. In some embodiments, the debug instructions can perform packet duplication actions, including packet encapsulation formatting, updating pipeline metadata and/or the packet destination. In other embodiments, the debug instructions can perform packet recirculation actions, in which packets are sent between the pipeline and a debugging tool at specific points along the pipeline.

In some embodiments, the inserted debug instructions can correspond to a number of granularity options. For example, one granularity level of debugging can include inserting a first debug instruction before an action is performed, and another debug instruction after the action is performed. Another granularity level can include inserting debug instructions after every function call. In some embodiments, the level of granularity can be adjusted by the developer, and/or can be specified by a debug-level parameter value.

The compiler-generated executable is then loaded to the network device. A corresponding compiler generated debug file that corresponds to the executable loaded to the network device is loaded to a debugger tool. During pipeline runtime, as network packets flow through the device, the network device transmits debug data (e.g., debug packets, and/or metadata) to the debugger tool that gathers the debug data. The debugger tool can then parse the debug data, digest the metadata, and correlate the information with the original program instructions. The debugger tool can use the debug file for context between the received debug data (e.g., packets with metadata), and the program instructions. In some embodiments, a user can interact with the debugger tool to gain pipeline visibility and debug the passing of packets through the packet processing pipeline.

Advantages of the present disclosure include, but are not limited to, providing deep visibility into how a packet is processed by a customized, programmable pipeline associated with a network device. By providing insight into specific programmable points in the packet processing pipeline, aspects of the present disclosure provide efficient identification of errors in the programmed instructions that enable developers to diagnose and correct issues in the logic. Furthermore, providing debug instructions at specific points in the programmable pipeline improves the overall performance of the system on which the network device is executed, e.g., by identifying performance bottlenecks, and providing insight on the specific point in the pipeline that caused the error. Conventional network debugging tools provide insight into how packets flow from one network device to another, while embodiments of the present disclosure provide a debugging tool for analyzing how a packet is processing through a single network device's programmable and customizable pipeline. Additionally, aspects of the present disclosure provide customizable debugging functionality without requiring specialized hardware. The solutions described herein are agnostic to specific programing language, and can be implemented on any network device that supports packet duplication and/or packet recirculation, and/or the ability to append or prepend pipeline metadata to the packet.

FIG. 1 illustrates an example computing environment 100, in accordance with embodiments of the present disclosure. It should be noted that other architectures for computing environment 100 are possible, and that the implementation of a computing environment utilizing embodiments of the present disclosure are not necessarily limited to the specific architecture depicted. Computing environment 100 may be a computing environment that is configured to provide on-demand availability of computing resources to consumers without direct management by the consumers. In one example, computing environment 100 may be a cloud computing environment (e.g., public cloud, private cloud, hybrid cloud) and the user devices and host devices may be associated with different entities (e.g., cloud consumer v. cloud provider). In another example, computing environment 100 may be an on-premises computing environment in which the user devices and host devices are associated with the same entity (e.g., same company, enterprise, or business entity). In the simplified example of FIG. 1, computing environment 100 may include a user device 110, a host device 105, and a network 140.

User device 110 may be any computing device that consumes the computing resources of host device 105 and may provide input data (e.g., code and/or configurations) that enable the host device 105 to execute computing tasks on behalf of user device 110. User device 110 may include one or more servers, workstations, desktop computers, laptop computers, tablet computers, mobile phones, robotic devices (e.g., drones, autonomous vehicles), personal digital assistants (PDAs), smart watches, other device, or a combination thereof.

Host device 105 may be a single host machine or multiple host machines arranged in a heterogeneous or homogenous group (e.g., cluster). In one example, host device 105 may be or include one more servers, workstations, personal computers (e.g., desktop computers, laptop computers), mobile computers (e.g., mobile phones, palm-sized computing devices, tablet computers, personal digital assistants (PDAs)), data storage devices (e.g., USB drive, Network Attached Storage (NAS), Storage Area Network (SAN)), network devices (e.g., routers, switches, access points), other devices, or a combination thereof.

Host device 105 may include multiple primary devices that include one or more resources, such as main memory (not pictured) and/or one or more processors 118. The processor 118 may be or include a Central Processing Unit (CPU) and may be referred to as the primary processor, host processor, main processor, other term, or a combination thereof. The processor may have an Instruction Set Architecture (ISA) that is the same or similar to x86, ARM, Power ISA, RISC-V, SPARC, MIPS, other architecture, or a combination thereof. The processor 118 may be coupled to memory, which may be shared by one or more devices of host device 105. The memory may be referred to as main memory, host memory, primary memory, other term, or a combination thereof. Host device 105 may include one or more virtualized computing environments (e.g., virtual machines, containers, etc.). A virtualized computing environment can include multiple virtual machines managed, for example, by a virtual machine monitor, a hypervisor, a host operating system (OS), etc. In other embodiments, a virtualized computing environment can include one or more containers managed, for example, by a host OS. Host device 105 may include or be coupled with one or more network devices 102. A network device 102 can be, for example, a data processing units (DPU) device, a network interface card (NIC), a switch, a network FPGA, or any other network device. Processor 118 can be part of a controller (not pictured) executed on host 105. The controller can manage and/or control the operations of the network device 102. The controller can be part of the host device 105. In some embodiments, the controller (e.g., processor 118, or parts of the processor 118) can be implemented in a separate physical device connected through a network (e.g., network 140). For example, the network device 102 can send packets to the pipeline debug tool 130 operating on processor 118 using packet encapsulation and/or tunneling techniques. In other embodiments, the controller (e.g., processor 118, or parts of the processor 118), can be implemented by a virtual machine. For example, the pipeline debug tool 130 can be implemented by a virtual machine that is connected to host 105, or a hypervisor to which the network device 102 is connected.

A network device 102 may be a computing device that is communicably coupled with host device 105 and may perform one or more data processing tasks for host device 105, such as a data process unit (DPU) device, a programmable switch, or a smart NIC, for example. Network device 102 may be internal or external to host device 105 and may be a peripheral device (e.g., PCIe device) in the form of a physical adapter, card, component, module, or other device that is physically located on the same chassis as host device 105 (e.g., same board, case, tower, rack, cabinet, room, building) or on a different chassis. Network device 102 may perform data processing tasks that are the same or similar to the data processing tasks performed by the processor of the host device 105, or may perform data processing tasks that are not performed by the processor of the host device 105.

The network device 102 can be a programmable device, such as a smart network interface card (NIC). A programmable network device can be described as a network device that can be configured and controlled through software or programming. In some embodiments, the network device 102 can process packets received from, e.g., user device 110 via network 140. Thus, a programmable device, such as network device 102, can include programmed instructions defining the processing of packets. A controller (e.g., executing processor 118) can include a pipeline generator 106 and/or a pipeline debug tool 130. The pipeline generator 106 can include a compiler 120. In some embodiments, the compiler 120 can receive code (e.g., from user device 110, from another component implemented on host 105, and/or from another device connected to network 140). The code can include logic to program a packet processing pipeline executable by the network device 102. The compiler 120 can compile the code into machine-readable instructions that the network device 102 can execute. Note that the pipeline generator 106 and/or the compiler 120 can run on a processor other than processor 118 (i.e., the pipeline generator 106 and the pipeline debug tool 130 can run on separate processors). In some embodiments, the pipeline generator 106 and/or the compiler 120 can run on the network device 102.

The code can define a pipeline (or multiple pipelines) for the network device 102 to process packets. The compiler 120 can identify debug instructions that are associated with program points in the code. The program points can correspond to various actions in the pipeline. During compilation, the compiler 120 can insert the debug instructions at the identified program points. Thus, the compiled machine-readable instructions can include programmed debug instructions within the programmed pipeline.

In some embodiments, the debug instructions can be identified based on input received from the user device 110, and/or by another component executing on host 105. In some embodiments, the debug instructions can correlate to a debug level, and the debug level can be received along with the original code. The debug level can specify the granularity of the debug instructions. Thus, for example, debug level 1 can include a low level of debugging in which the debug instructions are placed at the beginning and end of each action in a match action table. Debug level 2 can provide a few additional debug instructions inserted in the middle of execution of an action in match action table. Debug level 3 can provide for debug instructions after every operation perfumed in the packet processing pipeline. Note that there can be more or fewer than three debug levels.

Once compiled, the pipeline generator 106 can load the compiled code onto the network device 102. For example, the pipeline generator 106 can transfer a firmware image that includes the compiled code to memory of the network device 102, or can transfer the code directly to the network device 102. The pipeline generator 106 can store static debug data generated during the compile phase. Static debug data can be used to correlate runtime debug data generated by the network device 102 during packet processing, to the original source code.

As illustrated in FIG. 1, the network device 102 can include a packing processing pipeline 103. The packing processing pipeline 103 can receive and execute the compiled machine-readable instructions from the pipeline generator 106. The packing processing pipeline 103 can process received packets (e.g., received from user device 110). The packing processing pipeline 103 includes programmed debug instructions inserted at the programming points. As a packet reaches a debug instruction, the packing processing pipeline 103 can send debug data and/or metadata associated with the debug instruction to the pipeline debug tool 130. Some aspects of debug instructions are further described with respect to FIGS. 2, 4 and 5.

The pipeline debug tool 130 can include a packet collector 132, a debug data extractor 134, a data analyzer 136, and/or a reinjection component 138. The packet collector 132 can collect packets (including packet metadata and/or added buffers) from the packet processing pipeline 103. The packets collected by packet collector 132 can be debug packets. The debug data extractor 134 can extract all the data that is relevant to the debugging process. The data analyzer 136 can analyze the extracted debug data, e.g., by sorting and correlated the data to the original code. The reinjection component 138 can reinject packets into the packet processing pipeline 103.

In some embodiments, the pipeline debug tool 130 can operate within a remote controller (e.g., the pipeline debug tool 130 may not be directly attached to a physical port of the network device 102). Such embodiments, the reinjection component 138 can include encapsulating the packet before sending it back to the packet processing pipeline 103.

Figure 2:
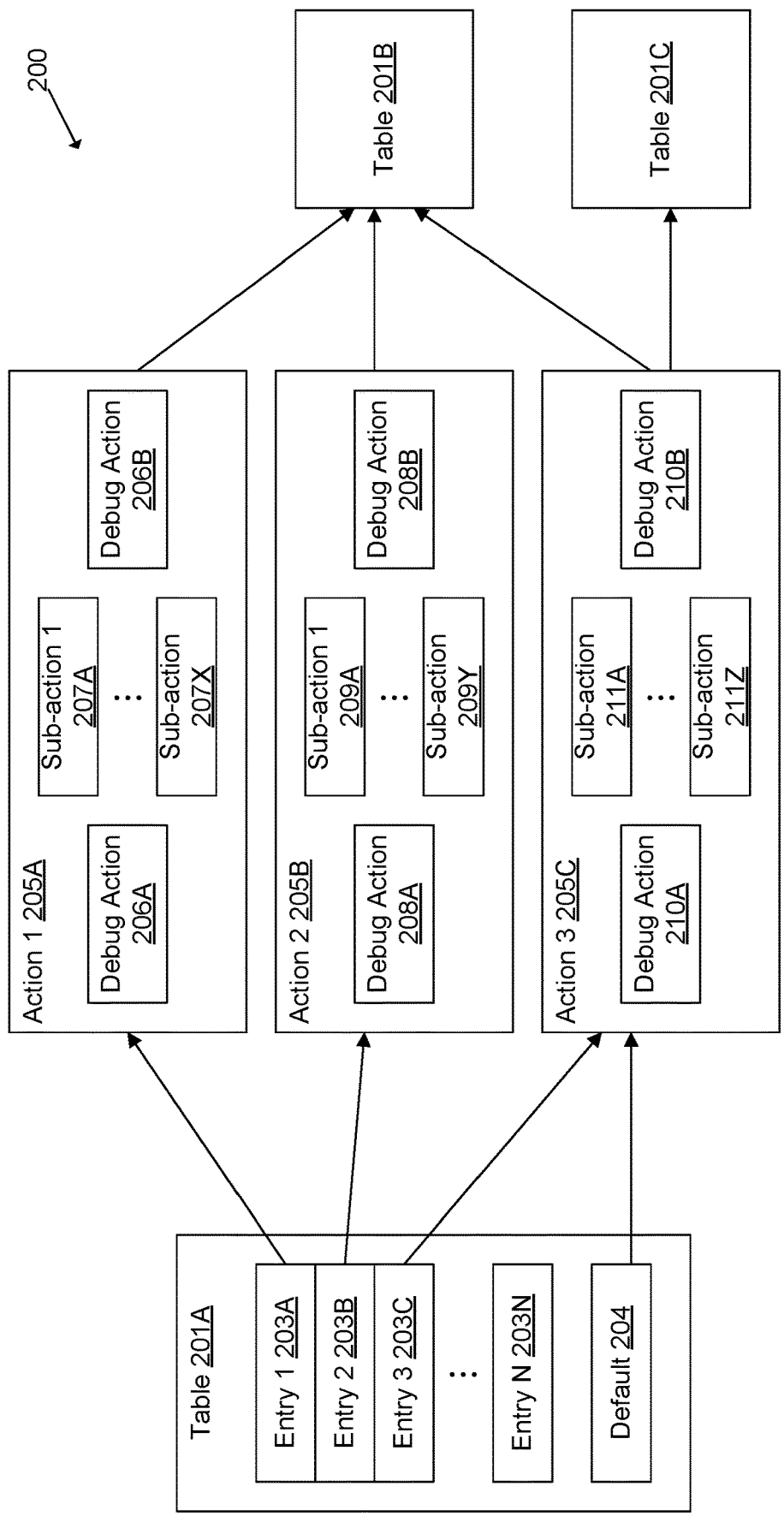
FIG. 2 depicts a block diagram illustrating a compiler debugger generation, in accordance with one or more aspects of the present disclosure.
Figure 3:
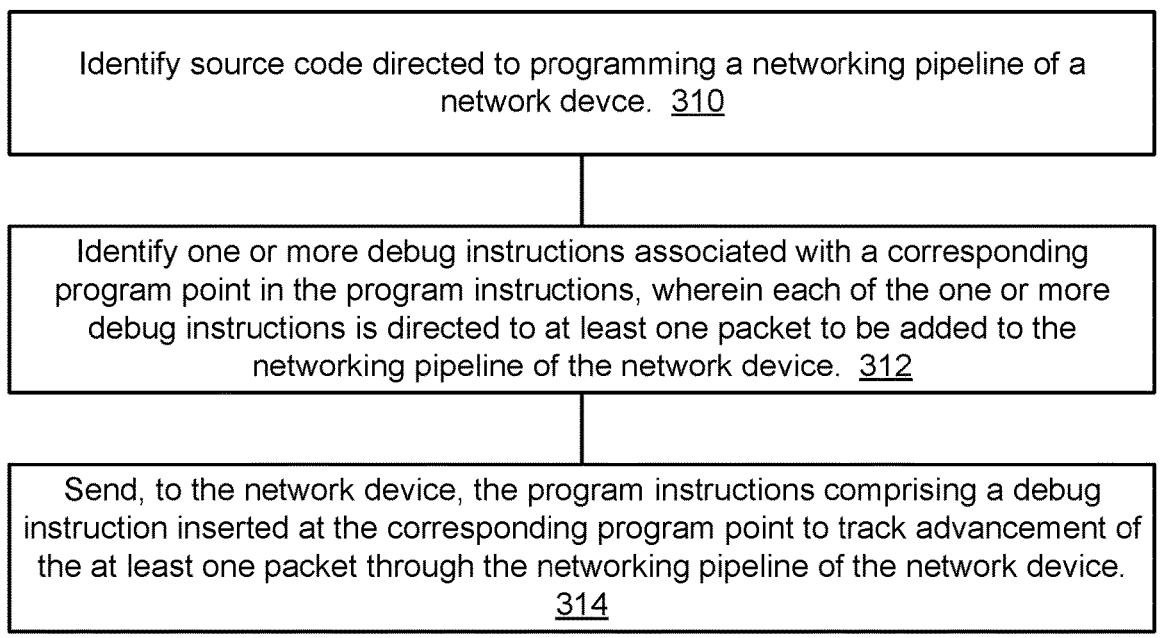
FIG. 3 is a flow diagram of an example method for implementing compiler insertion of debug instructions, in accordance with one or more aspects of the present disclosure.

Some aspects of the compiler 120 is further described with respect to FIGS. 2 and 3. Some aspects of the packing processing pipeline 103 and the pipeline debug tool 130 are further described with respect to FIGS. 4-7.

FIG. 2 depicts a block diagram illustrating a compiler debugger generation 200, in accordance with the one or more aspects of the present disclosure. The compiler (e.g., compiler 120 of FIG. 1) establishes (e.g., defines) match action tables (sometimes referred to as a flow table or a forwarding table). Match action tables can be used to determine how network packets are processed and forwarded through a processing pipeline (such as packet processing pipeline 103). A match action table can include match fields and the associated action(s). A match field describes the criteria and/or attributes used to match incoming packets against entries in the match action table. Match fields can include packet header fields, such as source and/or destination IP addresses, port numbers, protocol types, VLAN tags, and/or any other relevant packet information. In some embodiments, the match field can include match criteria (e.g., a match key). The matched action(s) describe actions to be performed on the packet(s) that match specific match field conditions (e.g., match the criteria and/or attributes described in the associated match field). An action can include multiple sub-actions, such as forwarding the packet to a specific port or interface, modifying the packet header fields, applying quality of service policies, dropping the packet, and/or sending the packet to a different processing pipeline.

As illustrated in FIG. 2, tables 201A-C can be match action tables. Table 201A can include a set of match criteria (e.g., match keys). Table 201A can include multiple entries 203A-N, and/or a default entry 204, that contain the values to be applied to the match criteria (or match keys). Each table entry 203A-N, 204 can have an associated table entry ID. When the network 102 receives a packet, the packet processing pipeline 103 can examine the header fields of the received packet. If it matches with one of the entries 203A-N, the packet processing pipeline 103 can execute the associated action 205A-C on the packet. In some embodiments, if no match is found, the packet processing pipeline 103 executes the default action 204 on the packet. As an illustrative example, if a packet matches the match field(s) of entry 1 203A, the packet processing pipeline 103 executes Action 1 205A on the packet. The packet can then be processed using table 201B.

The compiler 120 can identify certain program points in the received code at which to insert debug actions 206A-B, 208A-B, and/or 210A-B. Thus, the compiler can generate the match action tables, in which the actions include inserted debug actions. When an action 205A-C is performed on a received packet, the corresponding inserted debug actions can also be performed on the received packet. Some aspects of the debug actions are further described with respect to FIGS. 4-5.

The debug actions 206A-B, 208A-B, and/or 210A-B can vary depending on whether the network device 102 supports packet duplication. If the network device 102 supports packet duplication, the debug actions 206A-B, 208A-B, and/or 210A-B can cause the network device 102 to duplicate the packets, and send the duplicate packets to a debugging tool (e.g., pipeline debug tool 130 of FIG. 1). If the network device 102 does not support packet duplication, the debug actions 206A-B, 208A-B, and/or 210A-B can cause the network device 102 to add a buffer to the packet, and send the packet (including the added buffer) to a debugging tool (e.g., pipeline debug tool 130 of FIG. 1). The debugging tool can analyze the received packets, and can send the packets back to the network device 102. The network device 102 can then reinject the packet(s) received from the debugging tool into the packet processing pipeline, to continue through the pipeline. For example, if the packet and added buffer were sent to the debugging tool by debug action 206A, the network device 102 can identify sub-action 1 207A as the next executable action in the pipeline for when the packet reenters the pipeline. As another example, if the packet and added buffer were sent to the debugging tool by debug action 206B, the network device 102 can identify match action table 201B as the next executable action in the pipeline for when the packet reenters the pipeline. The buffer added to the packet can identify the packet as a debug packet (e.g., by including specific parameter values), and can include, for example, a copy of the state of the register values. For example, to facilitate debugging, because execution of sub-actions 207A-X can change the state of the registers, debug action 206A can send the packet (or a copy of the packet) to the debugging tool before the sub-actions 207A-X are executed, and debug action 206B can send the packet (or another copy of the packet) to the debugging tool after sub-actions 207A-X are executed.

In some embodiments, the code received by the compiler 120 can specify a debug granularity level. In such cases, the compiler can determine at which point(s) to insert debug instructions. For example, at a low granularity level, the compiler can insert debug actions 206A,B as illustrated in FIG. 2. At a higher granularity level, the compiler can insert a debug instruction after executing each sub-action 207A-N, in addition to debug actions 206A,B. There can be any number of debug granularity levels that include any number of debug instructions inserted in the packet processing pipeline 103.

Once the compiler 120 has generated the match action tables according to the received code, the pipeline generator 106 can transfer the generated match action tables 201A-C to the network device 102.

FIG. 3 is a flow diagram of an example method 300 for implementing compiler insertion of debug instructions, in accordance with one or more aspects of the present disclosure. In some embodiments, one or more operations of example method 300 can be performed by one or more components of FIG. 1, as described herein. Method 300 can be performed by processing logic that can include hardware (circuitry, dedicated logic, etc.), software (e.g., instructions run on a processing device), or a combination thereof. In one implementation, some or all of the operations of method 300 can be performed by host device 105. For example, some or all of the operations of method 300 can be performed by device 102, as described herein.

At block 310, processing logic identifies source code directed to programming a networking pipeline of a network device (e.g., device 102). In some embodiments, the source code can be received, e.g., from user device 110, from a component operating on host 105, and/or from another device connected to network 140. At block 312, processing logic identifies one or more debug instructions associated with a corresponding program point in the program instructions. Each of the one or more debug instructions is directed to at least one packet to be added to the networking pipeline of the network device.

In some embodiments, the source code can have an associated debug level. The one or more debug instructions can be identified based on the debug level. In some embodiments, the debug instructions include a packet encapsulation format, pipeline metadata, and/or a packet destination.

At block 314, processing logic sends, to the network device (e.g., device 102), the program instructions comprising a debug instruction inserted at the corresponding program point to track advancement of the at least one packet through the networking pipeline of the network device. In some embodiments, the processing logic identifies a table (such as a match action table) associated with the corresponding program point in the program instructions. The processing logic adds, to the table, a debug action that is associated with the debug instruction. In some embodiments, the debug action includes a first instruction to duplicate the packet prior to executing the program instruction at the corresponding program point, and a second instruction to duplicate the packet after executing the program instructions at the corresponding program point.

The first instruction to duplicate the packet includes an instruction to generate a duplicate packet that mirrors the packet. Packet duplication (sometimes referred to as a clone or mirror) can include creating a second packet that is a copy of the first packet. The processing logic can add a buffer to the duplicate packet. For example, the processing logic can prepend or append the buffer to the duplicate packet. The buffer can be referred to as a debug buffer. The processing logic can write, to the buffer, a pipeline table ID, a table entry ID, a timestamp, and/or program register value(s). The processing logic can send the duplicate packet, including the buffer, to a debug tool. In some embodiments, the debug tool can be remote (i.e., not directly attached to a physical port of the network device), and thus the processing logic can encapsulate the duplicate buffer (including the buffer) prior to sending it to the debug tool. Some aspects of the packet duplication process are further described with respect to FIGS. 4-5.

In some embodiments, the debug action includes a first instruction to forward a packet to a first queue prior to executing the program instruction at the corresponding program point, and a second instruction to forward the packet to a second queue after executing the program instructions at the corresponding program point. The first instruction to forward the packet to the first queue can include adding a buffer to the packet (e.g., prepending or appending a buffer to the packet). The processing logic can write, to the buffer, a recirculation counter value, a pipeline table ID, a table entry ID, a timestamp, and/or program register value(s). The recirculation counter value can represent the number of times a packet has been recirculation through the packet processing pipeline. For example, reinjection component 138 can increment the packet recirculation value each it reinjects a packet into the pack processing pipeline 103. The recirculation counter value can be informational, used by the debug tool (e.g., pipeline debug tool 130 of FIG. 1), and/or by a user of a device (e.g., user device 110 or host 105 of FIG. 1). The processing logic can send the packet (including the buffer) to the debug tool. As mentioned above, in embodiments in which the debug tool is not physically attached to the network device, the processing logic can encapsulate the packet (including the buffer) prior to sending the packet to the debug tool.

In some embodiments, the processing logic can receive the packet back from the debug tool. For example, the debug tool, once it has analyzed the packet (including the buffer), can send the packet and buffer back to the pipeline. Responsive to receiving the packet from the debug tool, the processing logic can remove the buffer from the packet. The processing logic can identify a pipeline entry point that immediately follows the entry point ID included in the buffer. The processing logic can then send the packet (with the buffer removed) to the identified pipeline entry point. Some aspects of the packet reinjection process are further described with respect to FIGS. 5.

Figure 4:
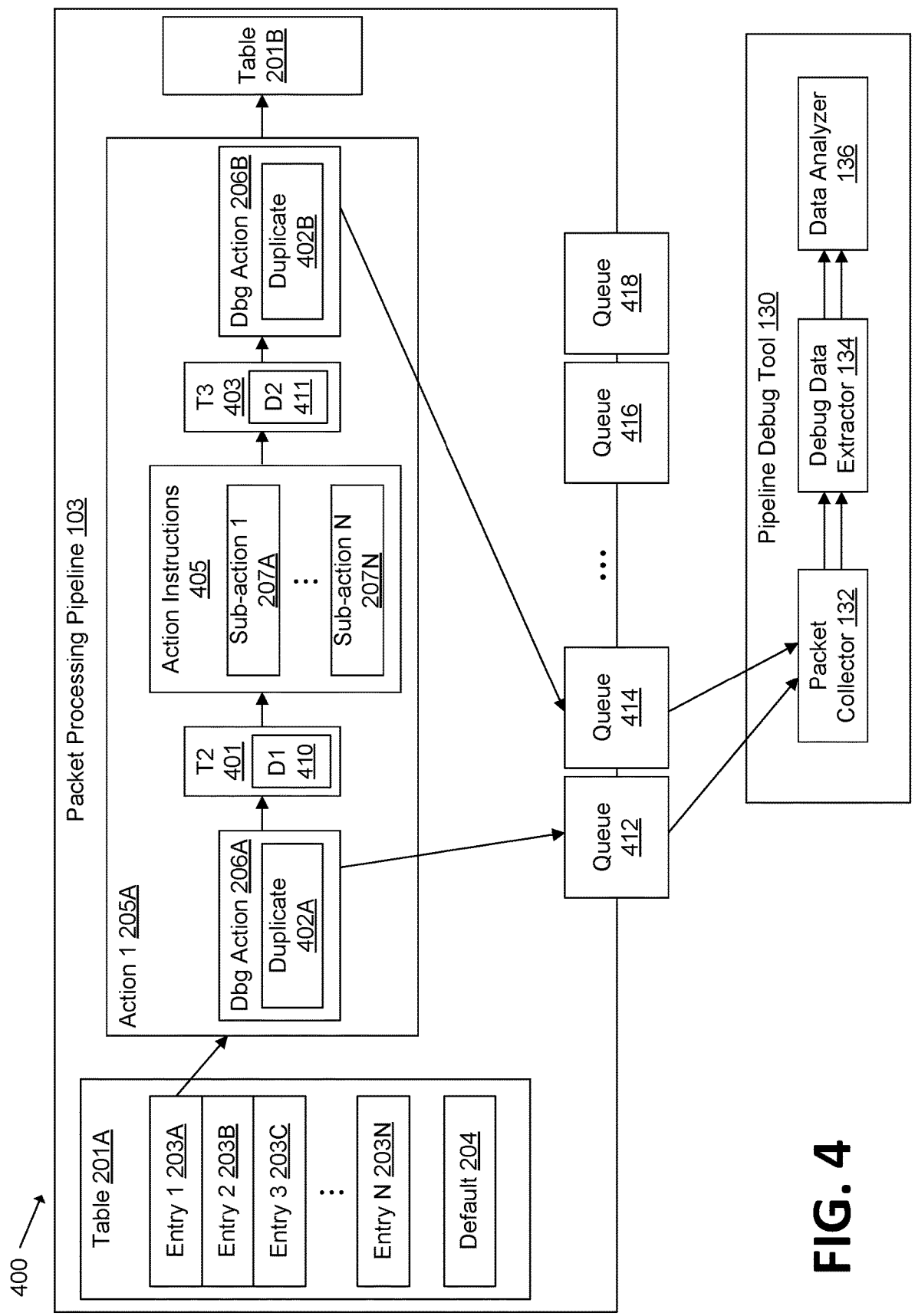
FIG. 4 depicts a block diagram illustrating packet duplication, in accordance with one or more aspects of the present disclosure.

FIG. 4 depicts a block diagram illustrating packet duplication, e.g., by a packet processing pipeline and debug tool 400 implemented on a network device that supports packet duplication, in accordance with one or more aspects of the present disclosure. The packet processing pipeline 103 can be generated by compiler 120 of FIG. 1, and can execute on network device 102. The packet processing pipeline 103 can transfer packets to the pipeline debug tool 130.

A packet can be received by the packet processing pipeline 103. The network device 102, through the packet processing pipeline 103, can form a match action lookup tuple (also referred to as a lookup key or keys) for a match action table, e.g., table 201A. The match action lookup tuple can be a set of fields used in the table lookup. The match action lookup tuple can vary for each match action table (201A-C). The match action lookup tuple can be derived from the packet and pipeline metadata. The network device 102, through the packet processing pipeline 103, can compare the match action lookup tuple to each entry 203A-N in table 201A to determine whether there is a match. If there is no match, the network device 102 can execute the action associated with the default entry 204. If there is a match the network device 102, through packet processing pipeline 103, can execute the action associated with the matching entry 203A-N.

As illustrated in FIG. 4, entry 1 203A of table 201A is associated with action 1 205A. Thus, upon matching the match action lookup tuple to entry 1 203A in table 201A, the network device 102, through the packet processing pipeline 103, can execute action 1 205A. If the matching action includes a debug action, the network device 102 can execute the debug action; otherwise, the network device 102 executes the action instructions associated the entry (e.g., action instructions 405).

As illustrated in FIG. 4, action 1 205A includes a debug action 206A. Thus, the network device 102, through the packet processing pipeline 103, executes the debug action 206A. Executing the debug action 206A can include duplicating the packet, e.g., by creating a mirror of the packet (e.g., 402A of FIG. 4). After duplicating the packet, the received packet and the duplicate packet are included in the packet processing pipeline 103.

Duplicate 402A can include an exact copy (or clone) of the packet. Debug action 206A can include adding a buffer to the duplicate buffer (e.g., duplicate 402A). That is, the network device 102, through the packet processing pipeline 103, prepends or appends a buffer to the duplicate packet. The network device 102, through the packet processing pipeline 103, can write the pipeline state to the buffer.

The debug action 206A can include forwarding the duplicate packet (including the buffer) to queue 412. For example, the network device 102, through the packet processing pipeline 103, can determine whether a packet is a duplicate packet. In some embodiments, the duplicate packet can have metadata that includes an indicator identifying it as a duplicate packet. Once a duplicate packet is identified, the network device 102 can send the duplicate packet to queue 412.

The original packet (i.e., not the duplicate) can proceed (e.g., be transferred) through the packet processing pipeline 103. The network device 102, through the packet processing pipeline 103, can identify the non-duplicate packet as not a duplicate packet (e.g., based on metadata and/or header field values of the packet), and thus process it through action instructions 405. The original packet can proceed to (e.g., be processed using) table T2 401, which can result in executing default action D1 410. The network device 102, through the packet processing pipeline 103, can execute sub-actions 207A-N. Following execution of action instructions 405, the packet can proceed to (e.g., be processed using) table T3, which can result in performing default action D2 411.

In some embodiments, the network device 102, through the packet processing pipeline 103, can identify a second debug action 206B after executing the action instructions 405 (or more precisely, after executing default action D2 411). The network device 102, through the packet processing pipeline 103, can execute the debug action 206B, which can include, for example, generating another duplicate of the packet after it has been processed through action instructions 405. The network device 102, through the packet processing pipeline 103, can generate duplicate packet 402B, and can send the duplicate packet 402B to queue 414. After executing the debug action 206B, the packet processing pipeline 103 can send the packet (i.e., the originally received, not duplicate packet) for processing using the next match action table 201B.

In some embodiments, the packet processing pipeline 103 can provide many different paths through which a packet can be processed. The matched actions in Table 201A, T2 401, and/or T3 403, can provide specific information about how the packet proceeded through the packet processing pipeline 103.

The pipeline debug tool 130 can include a packet collector 132, a debug data extractor 134, and/or a data analyzer 136. The packet collector 132 can collects the packets from queues 412-418. Note that there can be fewer or more queues than those illustrated in FIG. 4. In some embodiments, the packet collector 132 can collect the packets directly from packet processing pipeline 103 (i.e., without the use of queues). The packets collected by packet collector 132 can be debug packets. The debug data extractor 134 can extract the relevant data from the collected packets. That is, each packet that is sent to the packet collector 132 can include a tag to identify the order of the packet relative to other packets received by the packet collector 132. For example, relevant data can include a packet sequence number (PSN), a pipeline table ID, a table entry ID, and/or a timestamp. The packet sequence number can be used by the pipeline debug tool 130 to identify the order in which packets were processed by the packet processing pipeline 103. The pipeline table ID can identify the point in the pipeline at which the packet was sent (or copied and sent) to the pipeline debug tool 130. The table entry ID identifies the match action table entry that matched, and the action that was executed as a result of the match. The timestamp indicates the time at which the packet was sent and/or received by the pipeline debug tool 130. In some embodiments, the pipeline debug tool 130 can use the timestamp (rather than the packet sequence number) to order the packets by the order in which the packets were processed. In some embodiments, the timestamp can be used (rather than the packet sequence number) if the timestamp records time values to the nanosecond, in order to accurately identify the order of the received packets. Thus, the relevant data can indicate the path through which a packet was processed through the pipeline in a single programmable network device (e.g., network device 102).

The data analyzer 136 can analyze the extracted data. For example, the data analyzer 136 can sort the packets according to their sequence number (and/or timestamp), and associate the debug information with the corresponding pipeline table ID and/or table entry ID, and can correlate the data with the source code originally compiled by compiler 120. In some embodiments, the data analyzer 136 can provide data to a user (e.g., user of user device 110 and/or host 105).

Figure 5:
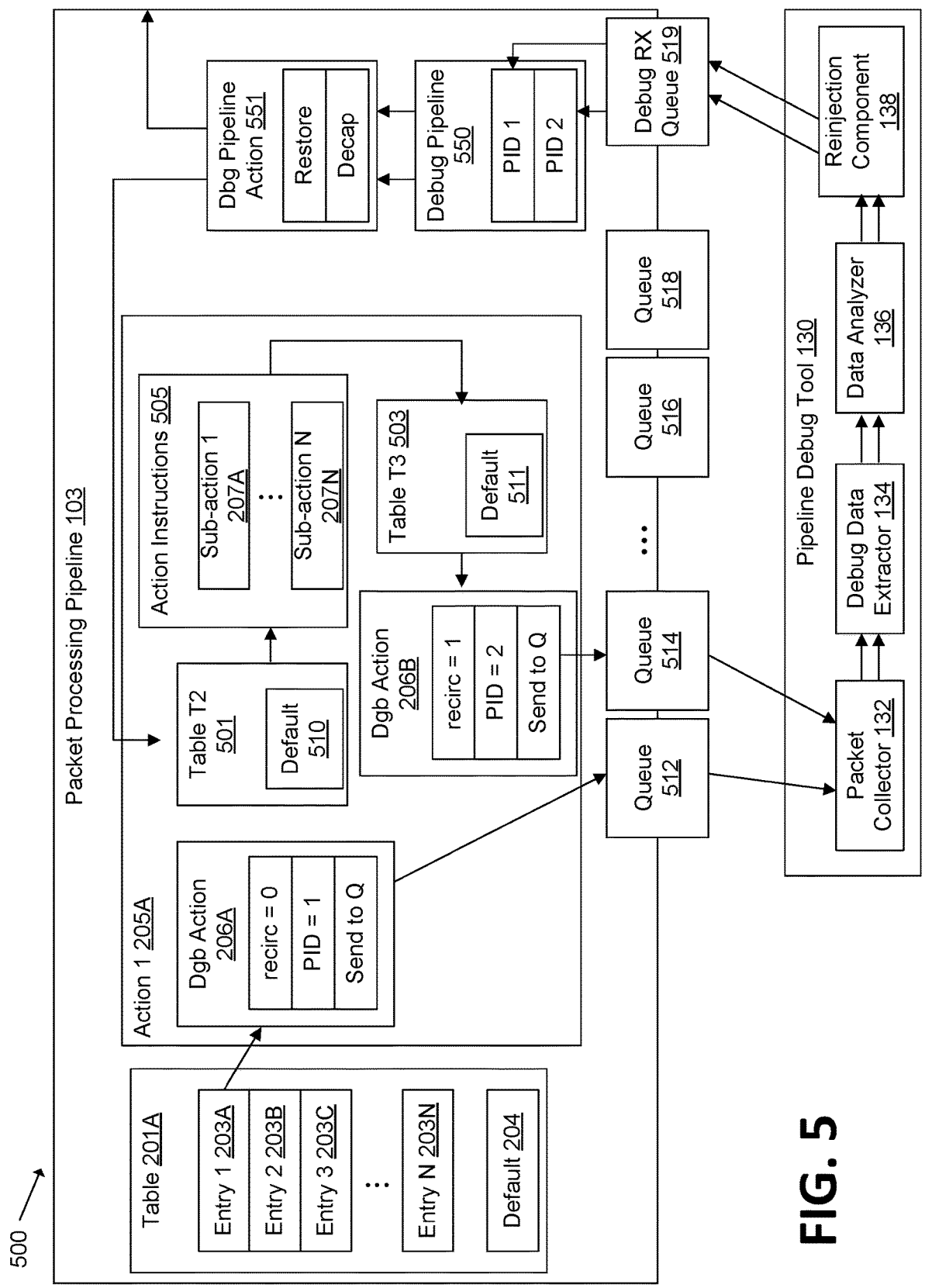
FIG. 5 depicts a block diagram illustrating packet reinjection, in accordance with one or more aspects of the present disclosure.

FIG. 5 depicts a block diagram illustrating packet re-injection, e.g. by a packet processing pipeline and debug tool 500 implemented on a network device that supports packet recirculation, in accordance with one or more aspects of the present disclosure. The packet processing pipeline 103 can be generated by compiler 120 of FIG. 1, and can execute on network device 102. The packet processing pipeline 103 can transfer packets to the pipeline debug tool 130.

As shown in FIG. 5, rather than duplicating a packet at the debug actions (e.g., debug actions 206A,B, 208A,B, and/or 210A,B), the debug actions can cause the network device 102, through the packet processing pipeline 103, to mark the packet as a debug packet and send the debug packet to the debugger tool. After the debugger tool has processed the debug packet, the packet can be recirculated through the packet processing pipeline 103.

Thus, a packet can be received by the packet processing pipeline 103. For example, the network device 102 can receive the packet from a port. The network device 102, through the packet processing pipeline 103, can determine whether the packet is a debug packet. In some embodiments, the debug packet can be identified based on a buffer added to the packet. If it is a debug packet, the network device 102, through the packet processing pipeline 103, can restore the packet to a previous state, remove the buffer, and identify the next point in the instructions, as further described with respect to debug receive (RX) queue 519, debug pipeline 550 and debug pipeline action 551.

If it is not identified as a debug packet, the network device 102, through the packet processing pipeline 103, can compare the match action lookup tuple to a match action table, e.g., table 201A. The network device 102, through the packet processing pipeline 103, can compare the match action lookup tuple to each entry 203A-N in table 201A to determine whether there is a match. If there is no match, the network device 102 can execute the action associated with the default entry 204. If there is a match the network device 102, through packet processing pipeline 103, can execute the action associated with the matching entry 203A-N.

As illustrated in FIG. 5, entry 1 203A of table 201A is associated with action 1 205A. Thus, upon matching the match action lookup tuple to entry 1 203A in table 201A, the network device 102, through the packet processing pipeline 103, can execute action 1 205A. If the matching action includes a debug action, the network device 102 can execute the debug action; otherwise, the network device 102 executes the action instructions associated with the entry.

As illustrated in FIG. 5, action 1 205A includes a debug action 206A. Thus, the network device 102, through the packet processing pipeline 103, executes the debug action 206A. Executing the debug action 206A can include adding a buffer to the packet. The buffer can include a recirculation counter value, a PID, and an instruction to send the packet (which is now identified as a debug packet due to the added buffer) to a queue (e.g., queue 512). In some embodiments, the debug action 206A can cause the network device 102 to copy the pipeline state to the buffer. To add the buffer to the packet, the network device 102 can append or prepend the buffer to the packet.

The pipeline debug tool 130 can include a packet collector 132, a debug data extractor 134, a data analyzer 136, and/or a reinjection component 138. The packet collector 132, debug data extractor 134, and data analyzer 136 can perform the same functions as described with respect to FIG. 4. In some embodiments, the relevant data extracted by debug data extractor 134 can include a packet sequence number, a pipeline table ID, a table entry ID, a recirculation counter value, and/or a timestamp. The packet sequence number can be used by the pipeline debug tool 130 to identify the order in which packets were processed by the packet processing pipeline 103. The pipeline table ID can identify the point in the pipeline at which the packet was sent to the pipeline debug tool 130. This enables the packet to be reinjected into the packet processing pipeline 103 at the next point in the pipeline. The table entry ID identifies the match action table entry that matched, and the action that was executed as a result of the match. The recirculation counter value indicates the number of times the packet was recirculated into the packet pipeline processing 103 (e.g., by the reinjection component 138). The timestamp indicates the time at which the packet was sent and/or received by the pipeline debug tool 130. In some embodiments, the pipeline debug tool 130 can use the timestamp (rather than the packet sequence number) to order the packets by the order in which the packets were processed. In some embodiments, the timestamp can be used (rather than the packet sequence number) if the timestamp records time values to the nanosecond, in order to accurately identify the order of the received packets. Thus, the relevant data can indicate the path through which a packet was processed through the pipeline in a single programmable network device (e.g., device 102). The reinjection component 138 can send the packet to a debug receive queue 519. In some embodiments, the reinjection component 138 can increment the recirculation counter value. In embodiments in which the network device 102 is remote (e.g., not physically connected to a port of host 105), the reinjection component 138 can encapsulate the packet prior to sending it to debug receive queue 519.

The network device 102, through the packet processing pipeline 103, can then receive the debug packet from debug receive queue 519. The network device 102, through the packet processing pipeline 103, can identify the debug packet received from debug receive queue 519 as a debug packet, e.g., based on the buffer added to the packet. The network device 102, through the packet processing pipeline 103, can process the debug packet at debug pipeline 550 by identifying the next instruction in the packet, based on the PID included in the buffer. The debug pipeline action 551 can restore the packet and decapsulate the packet (i.e., remove the buffer), and send the packet to the next point in the pipeline. The next point in the pipeline can be table T2 501. Thus, network device 102 can execute the default action 510 in T2 501. The packet can continue through the pipeline, causing the network device 102 to execute instructions 505, and eventually reaches debug action 206B, using table T3 503, subsequently resulting in debug action 206B. Debug action 206B can include adding a buffer to the packet. The buffer can include a recirculation counter value (=1), a PID (=2), and an instruction to send the packet (which is now, once again, identified as a debug packet due to the added buffer) to a queue (e.g., queue 514). In some embodiments, the debug action 206A can cause the network device 102 to copy the pipeline state to the buffer.

A packet that entered the pipeline debug tool 130 from queue 512 can have a value of PID=1 in the buffer. Thus, when the packet reenters the pipeline, the debug pipeline 550 can identify the next instruction, based on the value of PID=1 in the buffer, as table T2 501. As another example, a packet that entered the pipeline debug tool 130 from queue 514 can have a value of PID=2. Thus, when the packet reenters the pipeline, the debug pipeline 550 can identify the next instruction, based on the value of PID=1 in the buffer, as the next match action table (e.g., table 201B of FIG. 2).

Figure 6:
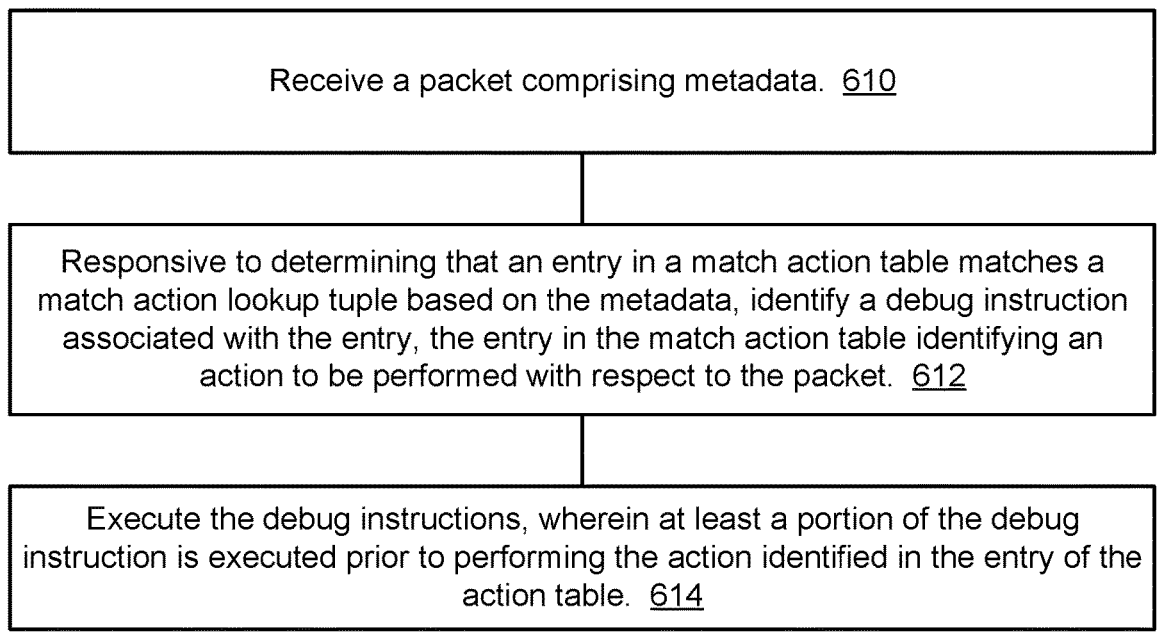
FIG. 6 is a flow diagram of an example method for implementing the pipeline debugger, in accordance with one or more aspects of the present disclosure.

FIG. 6 is a flow diagram of an example method 600 for implementing a pipeline debugger, in accordance with one or more aspects of the present disclosure. In some embodiments, one or more operations of example method 600 can be performed by one or more components of FIG. 1, as described herein. Method 600 can be performed by processing logic that can include hardware (circuitry, dedicated logic, etc.), software (e.g., instructions run on a processing device), or a combination thereof. In one implementation, some or all of the operations of method 600 can be performed by host device 105. For example, some or all of the operations of method 600 can be performed by network device 102, as described herein.

At block 610, processing logic receives a packet comprising metadata. The metadata can include, for example, a set of header fields from the packet, and/or metadata in the packet pipeline. The processing logic can identify a match action lookup tuple based on the metadata, i.e., a set of fields to use in the table lookup, derived from the packet and/or pipeline metadata. At block 612, responsive to determining that an entry in a match action table (e.g., tables 201-C) matches a match action lookup tuple based on the metadata, processing logic identifies a debug instruction associated with the entry. The entry in the match action table identifies an action to be performed with respect to the packet.

At block 614, processing logic executes the debug instruction. At least a portion of the debug instruction is executed prior to performing the action identified in the entry of the action table. For example, as illustrated in FIG. 4, debug action 206A is executed prior to action instructions 405, and debug action 206B is executed after execution of action instructions 405. After executing at least the portion of the debug instruction, the processing logic can forward the packet for processing using a following match action table. The following match action table can be the next match following the pipeline table ID. In some embodiments, the processing logic can forward the packet for processing using the next action in a list of actions. For instance, the processing logic can decompose a match action table with N actions to up to 1+N sub-tables, each sub-table including one action. Thus, the next action in the list of actions can be the next sub-table.

In some embodiments, executing the debug instructions can include generating a duplicate packet that includes a clone of the packet. A clone of the packet can be a copy of the packet. The processing logic can add a buffer to the duplicate packet (e.g., the processing logic can append and/or prepend the buffer to the duplicate packet). The buffer can be referred to as a debug buffer. The processing logic can write a pipeline table ID, a table entry ID, a timestamp, and/or program register value(s) to the buffer. The processing logic can then send, to the debug tool, the duplicate packet that includes the buffer. In some embodiments, sending the duplicate packet to the debug tool can include adding the duplicate packet to a queue. The queue can be a receiving port of the debug tool. In some embodiments, the queue can be a receive side scaling (RSS) queue.

In some embodiments, the processing logic can determine whether the packet is a debug packet. Responsive to determining that the packet is not a debug packet, executing the debug instruction can include adding (e.g., prepending and/or appending) a buffer to the packet. The processing logic can then write, to the buffer, a recirculation counter value, a pipeline table ID, a table entry ID, a timestamp, and/or program register value(s). The processing logic can send the packet, including the buffer, to a debug tool.

Responsive to determining that the packet is a debug packet, executing the debug instruction can include removing the buffer (e.g., the debug buffer) from the packet. The processing logic can restore the packet to a previous state, based on a debug pipeline table. That is, a debug pipeline table (e.g., debug pipeline 550 and/or debug pipeline action 551) can identify the next point in the pipeline the packet is to be processed (e.g., based on the pipeline table ID (PID) value as illustrated in FIG. 5). The processing logic can increment a recirculation counter value associated with metadata of the packet. The packet can then be reinjected into the beginning of the packet processing pipeline. The packet processing pipeline can identify the packet as a debug packet, can identify the next point in the pipeline the packet is to be processed, and can execute action(s) associated with the next point in the pipeline.

Figure 7:
FIG. 7 is a flow diagram of an example method for acquiring and analyzing debug data, in accordance with one or more aspects of the present disclosure.

FIG. 7 is a flow diagram of an example method 700 for acquiring and analyzing debug data, in accordance with one or more aspects of the present disclosure. In some embodiments, one or more operations of example method 700 can be performed by one or more components of FIG. 1, as described herein. Method 700 can be performed by processing logic that can include hardware (circuitry, dedicated logic, etc.), software (e.g., instructions run on a processing device), or a combination thereof. In one implementation, some or all of the operations of method 700 can be performed by host device 105 (e.g., by pipeline debug tool 130). In another implementation, some or all of the operations of method 700 can be performed device 102.

At block 710, processing logic identifies one or more packets in a queue associated with a network device. For example, the processing logic can identify one or more packets in queues 412,414 of FIG. 4, and/or queues 512, 514 of FIG. 5. At block 712, processing logic extracts information from the one or more packets. In some embodiments, extracting the debug information can include parsing the one or more packets for metadata. The debug information can include, for example, a recirculation counter value, a pipeline table ID, a table entry ID, a packet sequence number, a timestamp, and/or program register value(s).

At block 714, processing logic identifies a program point within source, wherein the program point corresponds to the debug information. At block 716, processing logic sends, to a user device (e.g., to user device 110), at least a portion of the debug information and the corresponding program point. In some embodiments, the processing logic can collect the debug information and, using the debug information, can sort the packets according to their proper sequence. The processing logic can then associate the pipeline debug information with each packet, and correlate this information back to the source code.

In some embodiments, the processing logic can send the one or more packets back to the network device (e.g., network device 102 of FIG. 1). In some embodiments, sending the one or more packets to the network device includes adding the one or more packets to a debug receive queue (e.g., debug RX queue 519). In some embodiments, the network device (e.g., device 102) can utilize a debug table (e.g., debug pipeline 550) to determine where to send the one or more packets in the debug receive queue. The debug action (e.g., debug pipeline action 551) can then restore and decapsulate the one or more packets, as is further described with respect to FIG. 5.

Figure 8:
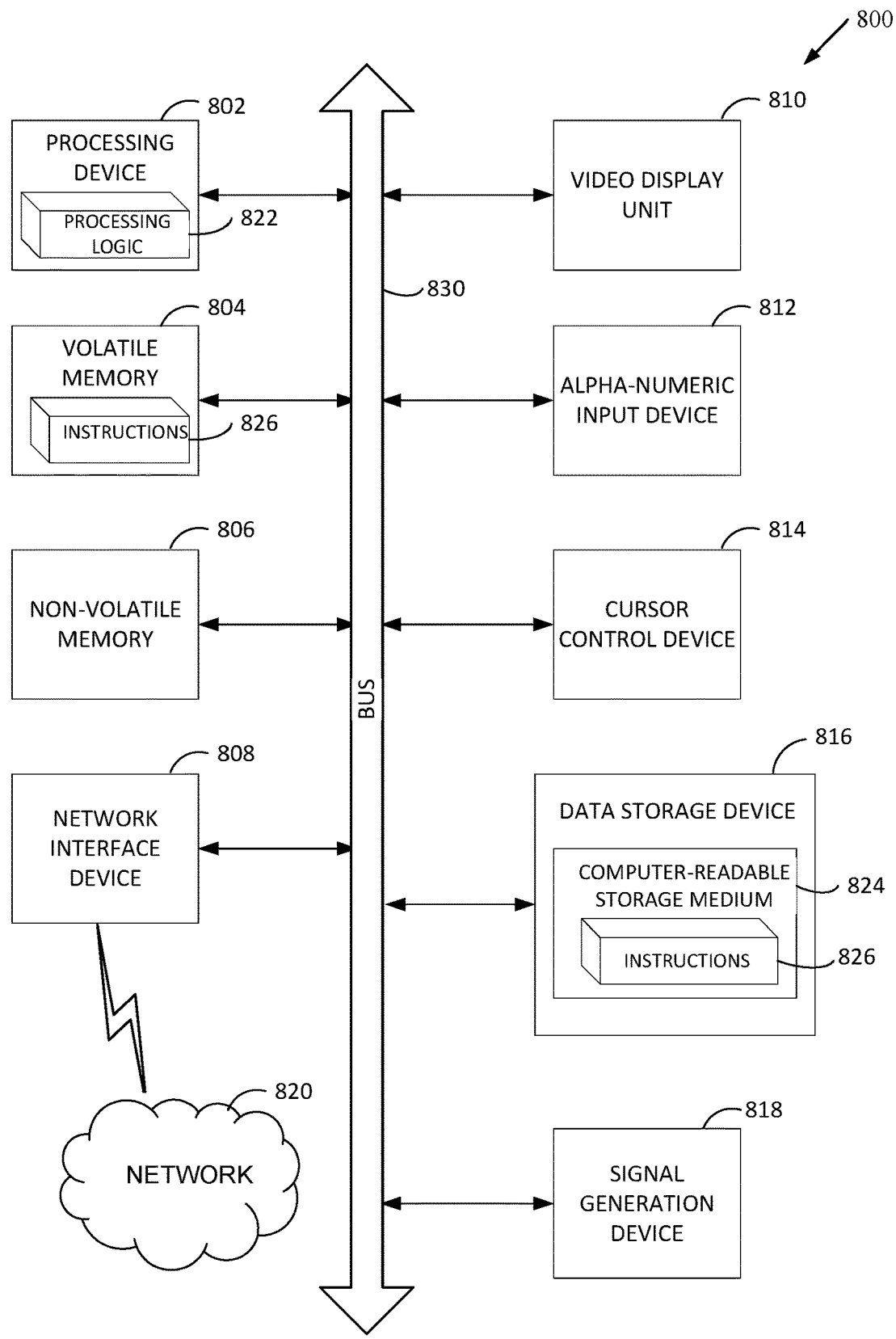
FIG. 8 depicts a block diagram illustrating an exemplary computer device, in accordance with one or more aspects of the present disclosure.

FIG. 8 illustrates a block diagram illustrating an exemplary computer device 800, in accordance with implementations of the present disclosure. Computer device 800 can correspond to one or more components of host 105, as described above. Example computer device 800 can be connected to other computer devices in a LAN, an intranet, an extranet, and/or the Internet. Computer device 800 can operate in the capacity of a server in a client-server network environment. Computer device 800 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 800 can include a processing device 802 (also referred to as a processor, CPU, or GPU), a volatile memory 804 (or main memory, e.g., read-only memory (ROM), flash memory, dynamic random access memory (DRAM) such as synchronous DRAM (SDRAM), etc.), a non-volatile memory 806 (e.g., flash memory, static random access memory (SRAM), etc.), and a secondary memory (e.g., a data storage device 816), which can communicate with each other via a bus 830.

Processing device 802 (which can include processing logic 822) represents one or more general-purpose processing devices such as a microprocessor, central processing unit, or the like. More particularly, processing device 802 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 can also be one or more special-purpose processing devices such as an ASIC, a FPGA, a digital signal processor (DSP), network processor, or the like. In accordance with one or more aspects of the present disclosure, processing device 802 can be configured to execute instructions performing methods 300, 600 and/or 700 for implement debugging in a packet processing pipeline.

Example computer device 800 can further comprise a network interface device 808, which can be communicatively coupled to a network 820. Example computer device 800 can further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 818 (e.g., a speaker).

Data storage device 816 can include a computer-readable storage medium (or, more specifically, a non-transitory computer-readable storage medium) 824 on which is stored one or more sets of executable instructions 826. In accordance with one or more aspects of the present disclosure, executable instructions 826 can comprise executable instructions performing methods 300, 600 and/or 700 for implement debugging in a packet processing pipeline.

Executable instructions 826 can also reside, completely or at least partially, within volatile memory 804 and/or within processing device 802 during execution thereof by example computer device 800, volatile memory 804 and processing device 802 also constituting computer-readable storage media. Executable instructions 826 can further be transmitted or received over a network via network interface device 808.

While the computer-readable storage medium 824 is shown in FIG. 8 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general-purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
    a network device to:
        receive a packet comprising metadata;
        responsive to determining that an entry in a match action table matches a match action lookup tuple based on the metadata, identify a debug instruction associated with the entry, the entry in the match action table identifying an action to be performed with respect to the packet; and
        execute the debug instruction, wherein at least a first portion of the debug instruction is executed prior to performing the action identified in the entry of the match action table and at least a second portion of the debug instruction is executed after performing the action identified in the entry of the match action table.

2. The system of claim 1, wherein executing the debug instruction comprises:
    generating a duplicate packet comprising a clone of the packet;
    adding a buffer to the duplicate packet;
    writing, to the buffer, at least one of: a pipeline table ID, a table entry ID, a timestamp, and one or more program register values; and
    sending, to a debug tool, the duplicate packet comprising the buffer.

3. The system of claim 2, wherein sending, to the debug tool, the duplicate packet comprising the buffer comprises adding the duplicate packet comprising the buffer to a queue.

4. The system of claim 1, wherein responsive to determining that the packet is not a debug packet, executing the debug instruction comprises:
    adding a buffer to the packet;

writing, to the buffer, at least one of: a recirculation counter value, a pipeline table ID, a table entry ID, a timestamp, and one or more program register values; and sending, to a debug tool, the packet comprising the buffer.

5. The system of claim 1, wherein responsive to determining that the packet is a debug packet, executing the debug instruction comprises:
remove a buffer from the packet;
restore the packet to a previous state based on a debug pipeline table; and
increment a recirculation counter value associated with metadata of the packet.

6. The system of claim 1, further comprising:
responsive to executing at least the first portion of the debug instruction, forwarding the packet to a next match action table following a pipeline table ID associated with the packet.

7. A method comprising:
identifying source code directed to programming a networking pipeline of a network device;
translating the source code to program instructions;
identifying one or more debug instructions associated with a corresponding program point in the program instructions, wherein each of the one or more debug instructions is directed to at least one packet to be added to the networking pipeline of the network device, wherein a first debug instruction of the one or more debug instructions is executed prior to execution of the corresponding program point in the program instructions, and wherein a second debug instruction of the one or more debug instructions is executed after the execution of the corresponding program point in the program instructions; and
sending, to the network device, the program instructions comprising a debug instruction inserted at the corresponding program point to track advancement of the at least one packet through the networking pipeline of the network device.

8. The method of claim 7, wherein the source code is associated with a debug level, and wherein the one or more debug instructions are identified based on the debug level.

9. The method of claim 7, wherein the one or more debug instructions comprise at least one of: a packet encapsulation format, a pipeline metadata, or a packet destination.

10. The method of claim 7, further comprising:
identifying a table associated with the corresponding program point in the program instructions; and
adding, to the table, a debug action associated with the one or more debug instructions.

11. The method of claim 10, wherein the debug action comprises the first debug instruction and the second debug instruction, the first debug instruction to duplicate a packet prior to executing the program instruction at the corresponding program point, and the second debug instruction to duplicate the packet after executing the program instructions at the corresponding program point.

12. The method of claim 11, wherein the first debug instruction to duplicate the packet comprises instructions to:
generate a duplicate packet that mirrors the packet;
add a buffer to the duplicate packet;
write, to the buffer, at least one of: a pipeline table ID, a table entry ID, a timestamp, and one or more program register values; and
send, to a debug tool, the duplicate packet comprising the buffer.

13. The method of claim 10, wherein the debug action comprises the first debug instruction and the second debug instruction, the first debug instruction to forward a packet to a first queue prior to executing the program instruction at the corresponding program point, and the second debug instruction to forward the packet to a second queue after executing the program instructions at the corresponding program point.

14. The method of claim 13, wherein the first debug instruction to forward the packet to the first queue comprises instructions to:
add a buffer to the packet;
write, to the buffer, at least one of: a recirculation counter value, a pipeline table ID, a table entry ID, a timestamp, and one or more program register values; and
send, to a debug tool, the packet comprising the buffer.

15. The method of claim 7, further comprising:
responsive to receiving the packet from a debug tool:
remove a buffer from the packet;
identify a pipeline entry point following a table entry ID associated with the packet; and
sending, to the identified pipeline entry point, the packet with the buffer removed.

16. A non-transitory computer-readable storage medium storing instructions that, when executed by a processing device, cause the processing device to perform operations comprising:
receive a packet comprising metadata;
responsive to determining that an entry in a match action table matches a match action lookup tuple based on the metadata, identify a debug instruction associated with the entry, the entry in the match action table identifying an action to be performed with respect to the packet; and
execute the debug instruction, wherein at least a first portion of the debug instruction is executed prior to performing the action identified in the entry of the match action table and at least a second portion of the debug instruction is executed after performing the action identified in the entry of the match action table.

17. The non-transitory computer-readable storage medium of claim 16, wherein the operations further comprise:
generating a duplicate packet comprising a clone of the packet;
adding a buffer to the duplicate packet;
writing, to the buffer, at least one of: a pipeline table ID, a table entry ID, a timestamp, and one or more program register values; and
sending, to a debug tool, the duplicate packet comprising the buffer.

18. The non-transitory computer-readable storage medium of claim 16, wherein responsive to determining that the packet is not a debug packet, executing the debug instruction comprises:
adding a buffer to the packet;
writing, to the buffer, at least one of: a recirculation counter value, a pipeline table ID, a table entry ID, a timestamp, and one or more program register values; and
sending, to a debug tool, the packet comprising the buffer.

19. The non-transitory computer-readable storage medium of claim 16, wherein responsive to determining that the packet is a debug packet, executing the debug instruction comprises:
remove a buffer from the packet;

restore the packet to a previous state based on a debug pipeline table; and increment a recirculation counter value associated with metadata of the packet.

20. The non-transitory computer-readable storage medium of claim 16, wherein the operations further comprise:

responsive to executing at least the first portion of the debug instruction, forwarding the packet to a next match action table following a pipeline table ID associated with the packet.

* * * * *